June 29, 1954
I. HERLITZ ET AL
2,682,634
MEANS FOR AUTOMATIC VOLTAGE CONTROL
IN SYNCHRONOUS MACHINES
Filed Feb. 21, 1952
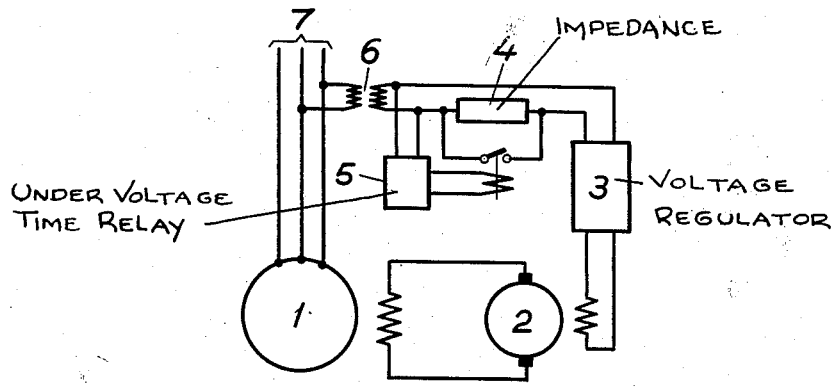
INVENTORS.
Ivar Herlitz and Niels Knudsen
BY
Attorney.

Patented June 29, 1954

2,682,634

UNITED STATES PATENT OFFICE 2,682,634

MEANS FOR AUTOMATIC VOLTAGE CONTROL IN SYNCHRONOUS MACHINES

Ivar Herlitz and Niels Knudsen, Vasteras, Sweden, assignors to Allmanna Svenska Elektriska Aktiebolaget, Vasteras, Sweden, a corporation of Sweden Application February 21, 1952, Serial No. 272,876

Claims priority, application Sweden February 28, 1951

3 Claims. (Cl. 322—59)

The present invention relates to means for the voltage control in synchronous machines having automatic voltage regulators, and it has for its purpose to improve the synchronous stability in the network at occurring disturbances. The disturbances chiefly concerned are short-circuits or ground faults in the network which, due to the voltage decrease generated by them, jeopardize the stability. Also a voltage regulator connected in a conventional, known manner acts to improve the stability in that it tries to increase the voltage during the very interval of the disturbance. However, the fault is normally switched off automatically within a fraction of one second, and it may then happen that the reverting voltage of operation frequency is higher than the voltage which occurred prior to the disturbance. A regulator connected in the usual manner would try to reduce the voltage to the same value as before the occurrence of the fault. This, however, is not desirable with respect to the synchronous stability, since the fault has given rise to an oscillation of the rotor of the synchronous machine, which oscillation may be better mastered the higher the voltage is. It is therefore desirable that the voltage regulator during the period immediately after the switching-off of the fault, as long as dangerous oscillations may be assumed to occur, tries to increase the voltage even if the latter already should be somewhat higher than normal. Such an increase of the voltage, however, has of course to be limited to a certain moderate value, inter alia with respect to the insulation.

The connecting means according to the invention, which has for its purpose such a voltage increase for improving the stability both during the occurrence of the fault and also during a critical period immediately succeeding the switching-off of the fault, is characterized in that the regulator is joined or provided with connection elements adapted to influence the regulator by decreasing the voltage applied thereto so that it temporarily controls the voltage of the synchronous machine after the switching-off of the fault, during a certain predetermined interval to an adjustable, somewhat higher level than during the operation prior to the fault.

The connection means according to the invention can be carried out in a manner which will be described reference being made to the accompanying connection diagram, in which 1 signifies a synchronous machine, 2 its exciter, 3 shows schematically a voltage regulator which may be, for example, of the common transductor type, 4 a pre-connected impedance, 5 a combined under-voltage-time relay, and 6 a voltage transformer. The network is designated by 7. The voltage of the network influences the regulator 3 through the voltage transformer, which at low voltage of course may be omitted. In the input circuit of the regulator 3, there is the pre-connected impedance 4, which is bridged at normal operation conditions. If a fault occurs in the network, its voltage decreases and influences the under-voltage-time relay 5 so that the impedance 4 is switched in and the regulator 3 is supplied with a lower voltage thus delivering, during a predetermined period, a higher voltage to the exciter 2, so that the voltage of the generator increases.

We claim as our invention:

1. In a regulating system in which the voltage of a network fed by synchronous generators is kept constant by voltage regulators responsive to the network voltage and serving to regulate exciters of the said generators, an arrangement for maintaining the stability of the network on the occurrence of faults therein, such arrangement comprising impedance means between the network and the voltage regulator of each generator, switching means bridging said impedance means under normal conditions but interconnecting it between the network and said regulator for temporarily decreasing the voltage supplied to the regulator after a fault has been switched off, and a timed under-voltage responsive device connected across the voltage of the network for operating the said switching means to switch in the said impedance means on the occurrence of such a fault.

2. An arrangement according to claim 1, in which the said impedance means controls the voltage supplied to the regulator during a predetermined period after the occurrence of a fault in the network.

3. An arrangement according to claim 1, comprising a voltage transformer interposed between the network and the regulator.

References Cited in the file of this patent

UNITED STATES PATENTS

| Number | Name | Date |
|---|---|---|
| 1,548,775 | Carothers | Aug. 4, 1925 |